(12) United States Patent
Johnsen et al.

(10) Patent No.: US 10,630,570 B2
(45) Date of Patent: Apr. 21, 2020

(54) SYSTEM AND METHOD FOR SUPPORTING WELL DEFINED SUBNET TOPOLOGY IN A MIDDLEWARE MACHINE ENVIRONMENT

(75) Inventors: Bjorn-Dag Johnsen, Oslo (NO); Line Holen, Fetsund (NO); Dag Georg Moxnes, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/235,161

(22) Filed: Sep. 16, 2011

(65) Prior Publication Data
US 2012/0072563 A1 Mar. 22, 2012

Related U.S. Application Data (60) Provisional application No. 61/384,228, filed on Sep. 17, 2010, provisional application No. 61/484,390, (Continued)

(51) Int. Cl.
*H04L 12/701* (2013.01)
*G06F 15/173* (2006.01)
(Continued)

(52) U.S. Cl.
CPC ............ *H04L 45/00* (2013.01); *H04L 12/462* (2013.01); *H04L 41/0659* (2013.01); *H04L 45/50* (2013.01); *H04L 69/40* (2013.01)

(58) Field of Classification Search
CPC . H04L 41/0213; H04L 29/06; H04L 12/5695; H04L 69/329; H04L 69/40;
(Continued)

(56) References Cited

U.S. PATENT DOCUMENTS 5,805,805 A    9/1998   Civanlar et al.
5,964,837 A *  10/1999  Chao et al. .................. 709/224
(Continued)

FOREIGN PATENT DOCUMENTS

CN    156787     1/2005
CN    1728664    2/2006
(Continued)

OTHER PUBLICATIONS

Network Working Group, RFC 4392: IP over InfiniBand Architecture, Apr. 2006 (Year: 2006).*
(Continued)

*Primary Examiner* — Backhean Tiv
*Assistant Examiner* — Schquita D Goodwin
(74) *Attorney, Agent, or Firm* — Tucker Ellis LLP (57) ABSTRACT

A system and method can support a middleware machine environment. The middleware machine environment can include a subnet manager and a plurality of fabric components, wherein each said fabric component is associated with a subnet management agent (SMA). The subnet manager maintains a topology graph that indicates how ports are connected in the subnet. The subnet manager operates to periodically reevaluate one or more states associated with each fabric component in the subnet by determining whether each SMA is responding correctly to a request.

18 Claims, 4 Drawing Sheets

Related U.S. Application Data filed on May 10, 2011, provisional application No. 61/493,330, filed on Jun. 3, 2011, provisional application No. 61/493,347, filed on Jun. 3, 2011, provisional application No. 61/498,329, filed on Jun. 17, 2011.

(51) Int. Cl.
 *H04L 12/46* (2006.01)
 *H04L 12/24* (2006.01)
 *H04L 12/723* (2013.01)
 *H04L 29/14* (2006.01)

(58) Field of Classification Search
 CPC ..... H04L 63/08; H04L 45/00; H04L 41/0659; H04L 41/12; H04L 12/462; H04L 45/02; H04L 45/08; H04L 45/50; G06F 13/409; G06F 9/4401; G06F 8/65; H04W 88/06
 USPC ............... 709/223, 209, 238, 202, 220, 224; 710/300; 455/552.1; 370/468, 254, 370/395.31, 218
 See application file for complete search history.

(56) References Cited

U.S. PATENT DOCUMENTS

| | | | |
|---|---|---|---|
| 6,014,669 A | 1/2000 | Slaughter | |
| 6,091,706 A | 7/2000 | Shaffer | |
| 6,202,067 B1 | 3/2001 | Blood | |
| 6,463,470 B1 | 10/2002 | Mohaban et al. | |
| 6,594,759 B1 | 7/2003 | Wang | |
| 6,647,419 B1 | 11/2003 | Mogul | |
| 6,678,835 B1 | 1/2004 | Shah et al. | |
| 6,748,429 B1 * | 6/2004 | Talluri et al. ................. | 709/221 |
| 6,829,685 B2 | 12/2004 | Neal et al. | |
| 6,904,545 B1 | 6/2005 | Erimli et al. | |
| 6,941,350 B1 * | 9/2005 | Frazier et al. ................ | 709/209 |
| 6,963,932 B2 | 11/2005 | Bhat | |
| 6,978,300 B1 * | 12/2005 | Beukema et al. ............. | 709/223 |
| 6,981,025 B1 | 12/2005 | Frazier et al. | |
| 7,023,811 B2 | 4/2006 | Pinto | |
| 7,069,468 B1 | 6/2006 | Olson et al. | |
| 7,113,995 B1 | 9/2006 | Beukema et al. | |
| 7,185,025 B2 | 2/2007 | Rosenstock et al. | |
| 7,194,538 B1 * | 3/2007 | Rabe ..................... | G06F 3/0605 709/220 |
| 7,194,540 B2 | 3/2007 | Aggarwal et al. | |
| 7,200,704 B2 | 4/2007 | Njoku et al. | |
| 7,216,163 B2 | 5/2007 | Sinn | |
| 7,221,676 B2 | 5/2007 | Green | |
| 7,231,518 B1 | 6/2007 | Bakke | |
| 7,290,277 B1 | 10/2007 | Chou et al. | |
| 7,302,484 B1 | 11/2007 | Stapp et al. | |
| 7,318,151 B1 | 1/2008 | Harris | |
| 7,356,841 B2 | 4/2008 | Wilson et al. | |
| 7,398,394 B1 | 7/2008 | Johnsen et al. | |
| 7,409,432 B1 | 8/2008 | Recio et al. | |
| 7,437,447 B2 | 10/2008 | Brey et al. | |
| 7,493,409 B2 | 2/2009 | Craddock et al. | |
| 7,500,236 B2 | 3/2009 | Janzen | |
| 7,633,955 B1 | 12/2009 | Saraiya et al. | |
| 7,634,608 B2 | 12/2009 | Droux et al. | |
| 7,636,772 B1 | 12/2009 | Kirby et al. | |
| 7,653,668 B1 | 1/2010 | Shelat | |
| 7,698,438 B1 * | 4/2010 | Shen ....................... | H04L 45/02 709/228 |
| 7,724,748 B2 | 5/2010 | Davis | |
| 7,783,788 B1 | 8/2010 | Quinn et al. | |
| 7,843,822 B1 | 11/2010 | Paul et al. | |
| 7,853,565 B1 | 12/2010 | Liskov | |
| 7,860,961 B1 | 12/2010 | Finkelstein et al. | |
| 7,873,711 B2 | 1/2011 | Adams et al. | |
| 7,930,583 B1 * | 4/2011 | Vemuri ............... | G06F 11/0727 709/223 |
| 7,953,890 B1 | 5/2011 | Katkar | |
| 7,975,147 B1 | 7/2011 | Qumei | |
| 8,108,551 B1 * | 1/2012 | Goel ................... | H04L 43/0811 709/242 |
| 8,108,732 B2 * | 1/2012 | Coronado ........... | G06F 11/0727 370/225 |
| 8,184,555 B1 * | 5/2012 | Mouton et al. ............... | 370/254 |
| 8,214,653 B1 | 7/2012 | Marr et al. | |
| 8,234,407 B2 | 7/2012 | Sugumar | |
| 8,291,148 B1 | 10/2012 | Shah et al. | |
| 8,327,437 B2 | 12/2012 | McAlister | |
| 8,331,381 B2 | 12/2012 | Brown et al. | |
| 8,335,915 B2 | 12/2012 | Plotkin et al. | |
| 8,423,780 B2 | 4/2013 | Plotkin et al. | |
| 8,549,281 B2 | 10/2013 | Samovskly et al. | |
| 8,583,921 B1 | 11/2013 | Shu | |
| 8,627,137 B1 * | 1/2014 | Vaidya ................ | H04L 41/0672 370/218 |
| 8,635,318 B1 | 1/2014 | Shankar | |
| 8,769,152 B2 * | 7/2014 | Gentieu ................ | H04L 12/66 709/223 |
| 8,924,952 B1 | 12/2014 | Hou | |
| 8,935,206 B2 | 1/2015 | Aguilera | |
| 8,935,333 B2 * | 1/2015 | Beukema ................ | H04L 12/18 709/205 |
| 8,972,966 B2 | 3/2015 | Kelso | |
| 2002/0049803 A1 * | 4/2002 | Bandhole ................ | H04L 29/06 718/104 |
| 2002/0059597 A1 | 5/2002 | Kikinis et al. | |
| 2002/0120720 A1 | 8/2002 | Moir | |
| 2002/0143914 A1 | 10/2002 | Cihula | |
| 2002/0188711 A1 | 12/2002 | Meyer et al. | |
| 2002/0198755 A1 | 12/2002 | Birkner | |
| 2003/0009551 A1 * | 1/2003 | Benfield et al. ............. | 709/224 |
| 2003/0033427 A1 * | 2/2003 | Brahmaroutu .......... | H04L 45/02 709/238 |
| 2003/0079040 A1 | 4/2003 | Jain et al. | |
| 2003/0093509 A1 | 5/2003 | Li et al. | |
| 2003/0103455 A1 * | 6/2003 | Pinto ...................... | H04L 45/02 370/230 |
| 2003/0105903 A1 * | 6/2003 | Garnett et al. ................ | 710/300 |
| 2003/0115276 A1 | 6/2003 | Flaherty | |
| 2003/0120852 A1 | 6/2003 | McConnell et al. | |
| 2003/0208572 A1 * | 11/2003 | Shah ...................... | H04L 41/12 709/223 |
| 2004/0022245 A1 | 2/2004 | Forbes et al. | |
| 2004/0031052 A1 | 2/2004 | Wannamaker | |
| 2004/0068501 A1 | 4/2004 | McGoveran | |
| 2004/0090925 A1 | 5/2004 | Schoeberl | |
| 2004/0139083 A1 | 7/2004 | Hahn | |
| 2004/0153849 A1 | 8/2004 | Tucker et al. | |
| 2004/0162973 A1 | 8/2004 | Rothman | |
| 2004/0193768 A1 | 9/2004 | Carnevale | |
| 2004/0199764 A1 | 10/2004 | Koechling et al. | |
| 2004/0220947 A1 | 11/2004 | Aman et al. | |
| 2004/0249928 A1 | 12/2004 | Jacobs et al. | |
| 2004/0255286 A1 | 12/2004 | Rothman | |
| 2005/0025520 A1 | 2/2005 | Murakami | |
| 2005/0044363 A1 | 2/2005 | Zimmer et al. | |
| 2005/0071382 A1 | 3/2005 | Rosenstock et al. | |
| 2005/0071709 A1 | 3/2005 | Rosenstock et al. | |
| 2005/0086342 A1 | 4/2005 | Burt et al. | |
| 2005/0091396 A1 | 4/2005 | Nilakantan et al. | |
| 2005/0105554 A1 * | 5/2005 | Kagan et al. ................. | 370/468 |
| 2005/0125520 A1 * | 6/2005 | Hanson et al. ............... | 709/223 |
| 2005/0182701 A1 | 8/2005 | Cheston | |
| 2005/0182831 A1 * | 8/2005 | Uchida et al. ................ | 709/220 |
| 2005/0182853 A1 | 8/2005 | Lewites et al. | |
| 2005/0198164 A1 | 9/2005 | Moore et al. | |
| 2005/0198250 A1 | 9/2005 | Wang | |
| 2005/0213608 A1 | 9/2005 | Modi | |
| 2005/0273641 A1 | 12/2005 | Sandven et al. | |
| 2006/0079278 A1 * | 4/2006 | Ferguson et al. ............. | 455/557 |
| 2006/0112297 A1 | 5/2006 | Davidson | |
| 2006/0114863 A1 | 6/2006 | Sanzgiri | |
| 2006/0168192 A1 | 7/2006 | Sharma | |
| 2006/0177103 A1 | 8/2006 | Hildreth | |
| 2006/0195560 A1 | 8/2006 | Newport | |

(56) References Cited

U.S. PATENT DOCUMENTS

| | | |
|---|---|---|
| 2006/0221975 A1 | 10/2006 | Lo et al. |
| 2006/0233168 A1 | 10/2006 | Lewites et al. |
| 2007/0016694 A1 | 1/2007 | Achler |
| 2007/0050763 A1 | 3/2007 | Kagan |
| 2007/0110245 A1 | 5/2007 | Sood et al. |
| 2007/0129917 A1 | 6/2007 | Blevins |
| 2007/0195774 A1 | 8/2007 | Sherman |
| 2007/0195794 A1 | 8/2007 | Fujita et al. |
| 2007/0206735 A1 | 9/2007 | Silver et al. |
| 2007/0253328 A1 | 11/2007 | Harper et al. |
| 2007/0260721 A1* | 11/2007 | Bose .................. H04L 41/0806 709/223 |
| 2007/0291535 A1* | 12/2007 | Eberle .................. H04L 49/109 365/174 |
| 2008/0031266 A1 | 2/2008 | Tallet et al. |
| 2008/0144614 A1 | 6/2008 | Fisher et al. |
| 2008/0159277 A1 | 7/2008 | Vobbilisetty et al. |
| 2008/0183853 A1 | 7/2008 | Manion et al. |
| 2008/0184332 A1 | 7/2008 | Gerkis |
| 2008/0192654 A1* | 8/2008 | Block .................. G06F 13/387 370/257 |
| 2008/0192750 A1 | 8/2008 | Ko et al. |
| 2008/0201486 A1 | 8/2008 | Hsu et al. |
| 2008/0209018 A1 | 8/2008 | Hernandez et al. |
| 2008/0229096 A1 | 9/2008 | Alroy et al. |
| 2008/0250125 A1 | 10/2008 | Brey et al. |
| 2008/0288646 A1 | 11/2008 | Hasha |
| 2008/0310421 A1 | 12/2008 | Teisberg |
| 2008/0310422 A1 | 12/2008 | Booth et al. |
| 2009/0016356 A1* | 1/2009 | He .......................... H04L 45/00 370/395.31 |
| 2009/0049164 A1 | 2/2009 | Mizuno |
| 2009/0067321 A1* | 3/2009 | Veits ........................ H04L 45/02 370/217 |
| 2009/0106771 A1* | 4/2009 | Benner ............... H04L 67/1097 719/313 |
| 2009/0116404 A1* | 5/2009 | Mahop et al. ................. 370/254 |
| 2009/0178033 A1 | 7/2009 | Challener |
| 2009/0216853 A1* | 8/2009 | Burrow .................. H04L 41/12 709/208 |
| 2009/0249472 A1 | 10/2009 | Litvin et al. |
| 2009/0271472 A1* | 10/2009 | Scheifler ................. G06F 9/485 709/202 |
| 2009/0307499 A1 | 12/2009 | Senda |
| 2009/0327462 A1 | 12/2009 | Adams et al. |
| 2010/0014526 A1 | 1/2010 | Chavan |
| 2010/0020806 A1 | 1/2010 | Vahdat et al. |
| 2010/0080117 A1 | 4/2010 | Coronado et al. |
| 2010/0082853 A1 | 4/2010 | Block et al. |
| 2010/0114826 A1 | 5/2010 | Voutilainen |
| 2010/0138532 A1* | 6/2010 | Glaeser .................. H04L 41/12 709/224 |
| 2010/0142544 A1 | 6/2010 | Chapel et al. |
| 2010/0166167 A1 | 7/2010 | Karimi-Cherkandi et al. |
| 2010/0235488 A1 | 9/2010 | Sharma et al. |
| 2010/0246593 A1* | 9/2010 | Belanger ............ H04L 47/2483 370/419 |
| 2010/0268857 A1 | 10/2010 | Bauman et al. |
| 2010/0306772 A1 | 12/2010 | Arnold et al. |
| 2011/0022574 A1 | 1/2011 | Hansen |
| 2011/0038254 A1* | 2/2011 | Hashiguchi ......... H04L 45/1283 370/217 |
| 2011/0072206 A1 | 3/2011 | Ross et al. |
| 2011/0110366 A1 | 5/2011 | Moore et al. |
| 2011/0138082 A1 | 6/2011 | Khatri |
| 2011/0138185 A1 | 6/2011 | Ju et al. |
| 2011/0173302 A1 | 7/2011 | Rider |
| 2011/0209202 A1 | 8/2011 | Otranen |
| 2011/0222492 A1 | 9/2011 | Borsella et al. |
| 2011/0264577 A1 | 10/2011 | Winbom et al. |
| 2011/0283017 A1 | 11/2011 | Alkhatib |
| 2011/0307886 A1 | 12/2011 | Thanga |
| 2012/0005480 A1 | 1/2012 | Batke et al. |
| 2012/0039331 A1 | 2/2012 | Astigarraga et al. |
| 2012/0195417 A1 | 8/2012 | Hua et al. |
| 2012/0239928 A1 | 9/2012 | Judell |
| 2012/0290698 A1 | 11/2012 | Alroy et al. |
| 2013/0041969 A1 | 2/2013 | Falco et al. |
| 2013/0046904 A1 | 2/2013 | Hilland |
| 2013/0138836 A1 | 5/2013 | Cohen et al. |
| 2013/0159865 A1 | 6/2013 | Smith et al. |
| 2013/0179870 A1 | 7/2013 | Kelso |
| 2013/0191622 A1 | 7/2013 | Sasaki |
| 2014/0095853 A1 | 4/2014 | Sarangshar |
| 2014/0095876 A1 | 4/2014 | Smith et al. |

FOREIGN PATENT DOCUMENTS

| | | |
|---|---|---|
| EP | 2 051 436 A1 | 4/2009 |
| JP | 2001075810 | 3/2001 |
| JP | 2002 247089 | 8/2002 |
| JP | 2002278906 | 9/2002 |
| JP | 2004166263 | 6/2004 |
| JP | 2006157285 | 6/2006 |
| JP | 2007501563 | 1/2007 |
| JP | 2008 054214 | 3/2008 |
| JP | 2009080592 | 4/2009 |
| WO | 01/90838 A2 | 11/2001 |
| WO | 2003088050 | 10/2003 |
| WO | 2008099479 | 8/2008 |
| WO | 2013009846 | 1/2013 |

OTHER PUBLICATIONS

Xin Yuan, Infiniband Subnet Management, Sep. 4, 2006 (Year: 2006).*

Shanley, Tom, Infiniband Network Architecture (excerpt), Pearson Education, published 2002, p. 209-211, 393-394, 551, 554.

Aurelio Bermudez, On the InfiniBand Subnet Discovery Process, IEEE the Computer Society 2003, pp. 1-6.

Tom Shanley, Infiniband Network Architecture, Pearson Education 2002, p. 559, 561.

Tom Shanley, Infiniband Network Architecture (excerpt), chapter—Detailed Description of the Link Layer, Pearson Education, published 2002, p. 390-392, 485, 491-493, 537-539.

InfiniBand[SM] Trade Association, InfiniBand™ Architecture Specification, vol. 1, Release 1.2.1, Nov. 2007, pp. 1-1727.

International Search Report and Written Opinion dated Dec. 15, 2011, International Application No. PCT/US2011/052033, 11 pages.

International Search Report and Written Opinion dated Dec. 15, 2011, International Application No. PCT/US2011/052021, 9 pages.

International Search Report and Written Opinion dated Jan. 11, 2012, International Application No. PCT/US2011/052029, 9 pages.

International Search Report and Written Opinion dated Sep. 12, 2012, International Application No. PCT/US2012/040775, 13 pages.

Manhee Lee, Security Enhancement in Infiniband Architecture, Apr. 2005, IEEE, vol. 19, pp. 1-18.

Shanley, Tom, "Infiniband Network Architecture", Pearson Education, Copyright © 2002 by MindShare, Inc., published Oct. 2002, p. 387-394.

Shanley, Tom, "Infiniband Network Architecture" (excerpt), Pearson Education, Copyright © 2002 by MindShare, Inc., published Oct. 2002, p. 204-209, 560-564.

State Intellectual Property Office of the People's Republic of China, Search Report dated Sep. 9, 2015 for Chinese Patent Application No. 201280027279.1, 2 pages.

Tom Shanley, Infiniband Network Architecture (excerpt), Pearson Education, Published 2002, p. 213.

State Intellectual Property Office of the People's Republic of China, Search Report dated Jun. 3, 2015 for Chinese Patent Application No. 201180039807.0, 2 pages.

State Intellectual Property Office of the People's Republic of China, Search Report dated May 29, 2015 for Chinese Patent Application No. 201180040064.9, 1 page.

Shanley, Tom, "Infiniband Network Architecture", Pearson Education, Copyright © 2002 by MindShare, Inc., published Oct. 2002, p. 83-87, 95-102, 205-208, 403-406.

(56) References Cited

OTHER PUBLICATIONS

Shanley, Tom, "Infiniband Network Architecture", Pearson Education, Copyright © 2002 by MindShare, Inc., published Oct. 2002, p. 206-208, 403-406.
Kashyap, V., "IP over InfiniBand (IpoIB) Architecture", Network Working Group, Request for Comments: 4392, Apr. 2006, 22 pages.
State Intellectual Property Office of the People's Republic of China dated May 5, 2015 for Chinese Patent Application No. 201180039850.7, 2 pages.
Shanley, Tom, "Infiniband Network Architecture" (Excerpt), Copyright 2002 by Mindshare, Inc., pp. 8-9, 391-396, 549-551.
United States Patent and Trademark Office, Office Action dated Apr. 8, 2016 for U.S Appl. No. 13/235,130, 32 pages.
United States Patent and Trademark Office, Office Action dated May 6, 2016 for U.S. Appl. No. 13/488,192, 14 Pages.
Shanley, Tom, "Infiniband Network Architecture" (Excerpt), Copyright 2002 by Mindshare, Inc., p. 86-87.
Ching-Min Lin et al., "A New Quorum-Based Scheme for Managing Replicated Data in Distributed Systems" IEEE Transactions on Computers, vol. 51, No. 12, Dec. 2002, 6 Pages.
United States Patent and Trademark Office, Office Action dated Nov. 16, 2017 for U.S. Appl. No. 13/235,113, 28 Pages.
United States Patent and Trademark Office, Office Action dated Apr. 18, 2017 for U.S. Appl. No. 13/235,113, 30 Pages.
Japanese Office Action dated Aug. 28, 2018 for Japanese Patent Application No. 2016-535693, 5 pages.
European Patent Office, International Searching Authority, International Search Report and Written Opinion dated Mar. 25, 2015 for International Application No. PCT/US2014/059949, 12 Pages.
European Patent Office, Communication Pursuant to Article 94(3) EPC dated Apr. 10, 2019 for European Patent Application No. 14796579.2, 5 Pages.
Mellanox Technologies, "Boot over IB (BoIB) User's Manual Rev 1.0", © copyright 2008, 28 pages, retrieved Apr. 7, 2015 from: <http://www.mellanox.com/pdf/BoIB/Boot-over-IB_User_Manual_1_0.pdf>.
Mellanox Technologies, "InfiniScale® IV 8-Port QSFP 40 Gb/s InfiniBand Switch User Manual Rev 1.4", © copyright 2012, 55 pages, retrieved Apr. 7, 2015 from: <http://www.mellanox.com/related-docs/user_manuals/IS5022_User_Manual.pdf>.

\* cited by examiner

SYSTEM AND METHOD FOR SUPPORTING WELL DEFINED SUBNET TOPOLOGY IN A MIDDLEWARE MACHINE ENVIRONMENT

CLAIM OF PRIORITY

This application claims the benefit of priority on U.S. Provisional Patent Application No. 61/384,228, entitled "SYSTEM FOR USE WITH A MIDDLEWARE MACHINE PLATFORM" filed Sep. 17, 2010; U.S. Provisional Patent Application No. 61/484,390, entitled "SYSTEM FOR USE WITH A MIDDLEWARE MACHINE PLATFORM" filed May 10, 2011; U.S. Provisional Patent Application No. 61/493,330, entitled "STATEFUL SUBNET MANAGER FAILOVER IN A MIDDLEWARE MACHINE ENVIRONMENT" filed Jun. 3, 2011; U.S. Provisional Patent Application No. 61/493,347, entitled "PERFORMING PARTIAL SUBNET INITIALIZATION IN A MIDDLEWARE MACHINE ENVIRONMENT" filed Jun. 3, 2011; U.S. Provisional Patent Application No. 61/498,329, entitled "SYSTEM AND METHOD FOR SUPPORTING A MIDDLEWARE MACHINE ENVIRONMENT" filed Jun. 17, 2011, each of which applications are herein incorporated by reference.

FIELD OF INVENTION

The present invention is generally related to computer systems and software such as middleware, and is particularly related to supporting a middleware machine environment.

BACKGROUND

INFINIBAND® (IB) Architecture is a communications and management infrastructure that supports both I/O and interprocessor communications for one or more computer systems. An IB Architecture system can scale from a small server with a few processors and a few I/O devices to a massively parallel installation with hundreds of processors and thousands of I/O devices.

The IB Architecture defines a switched communications fabric allowing many devices to concurrently communicate with high bandwidth and low latency in a protected, remotely managed environment. An end node can communicate with over multiple IB Architecture ports and can utilize multiple paths through the IB Architecture fabric. A multiplicity of IB Architecture ports and paths through the network are provided for both fault tolerance and increased data transfer bandwidth.

These are the generally areas that embodiments of the invention are intended to address.

SUMMARY

Described herein is a system and method that can support a middleware machine environment. The middleware machine environment can include a subnet manager and a plurality of fabric components, wherein each said fabric component is associated with a subnet management agent (SMA). The subnet manager maintains a topology graph that indicates how ports are connected to other ports in the subnet. The subnet manager operates to periodically reevaluate one or more states associated with each fabric component in the subnet by determining whether each SMA is responding correctly to a request.

DETAILED DESCRIPTION

Described herein is a system and method for providing a middleware machine or similar platform. In accordance with an embodiment of the invention, the system comprises a combination of high performance hardware (e.g. 64-bit processor technology, high performance large memory, and redundant INFINIBAND® and Ethernet networking) together with an application server or middleware environment, such as WebLogic Suite, to provide a complete Java EE application server complex which includes a massively parallel in-memory grid, that can be provisioned quickly, and that can scale on demand. In accordance with an embodiment of the invention, the system can be deployed as a full, half, or quarter rack, or other configuration, that provides an application server grid, storage area network, and INFINIBAND® (IB) network. The middleware machine software can provide application server, middleware and other functionality such as, for example, WebLogic Server, JRockit or Hotspot JVM, Oracle Linux or Solaris, and Oracle VM. In accordance with an embodiment of the invention, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

Figure 1:
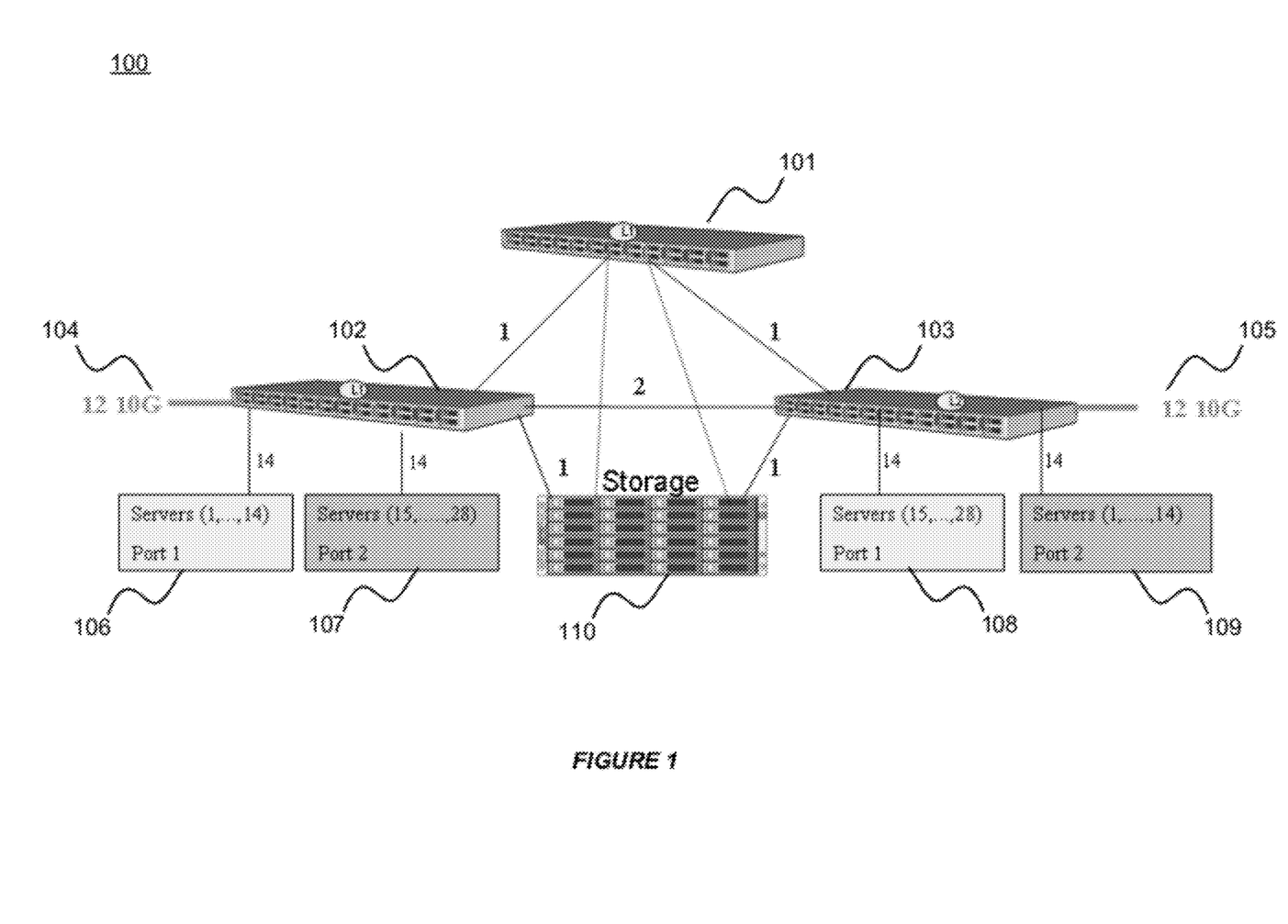
FIG. 1 shows an illustration of an exemplary configuration for a middleware machine, in accordance with an embodiment of the invention.

FIG. 1 shows an illustration of an exemplary configuration for a middleware machine, in accordance with an embodiment of the invention. As shown in FIG. 1, the middleware machine 100 uses a single rack configuration that includes two gateway network switches, or leaf network switches, 102 and 103 that connect to twenty-eight server nodes. Additionally, there can be different configurations for the middleware machine. For example, there can be a half rack configuration that contains a portion of the server nodes, and there can also be a multi-rack configuration that contains a large number of servers.

As shown in FIG. 1, the server nodes can connect to the ports provided by the gateway network switches. As shown in FIG. 1, each server machine can have connections to the two gateway network switches 102 and 103 separately. For example, the gateway network switch 102 connects to the port 1 of the servers 1-14 106 and the port 2 of the servers 15-28 107, and the gateway network switch 103 connects to the port 2 of the servers 1-14 109 and the port 1 of the servers 15-28 108.

In accordance with an embodiment of the invention, each gateway network switch can have multiple internal ports that are used to connect with different servers, and the gateway network switch can also have external ports that are used to connect with an external network, such as an existing data center service network 104-105 (12 10G connections).

In accordance with an embodiment of the invention, the middleware machine can include a separate storage system 110 that connects to the servers through the gateway network switches 102-103 using single (1) link. Additionally, the middleware machine can include a spine network switch 101 that connects to the two gateway network switches 102 and 103 using single (1) link. As shown in FIG. 1, there can be optionally two (2) links from the storage system to the spine network switch.

IB Fabric/Subnet

In accordance with an embodiment of the invention, an IB Fabric/Subnet in a middleware machine environment can contain a large number of physical hosts or servers, switch instances and gateway instances that are interconnected in a fat-tree topology.

Figure 2:
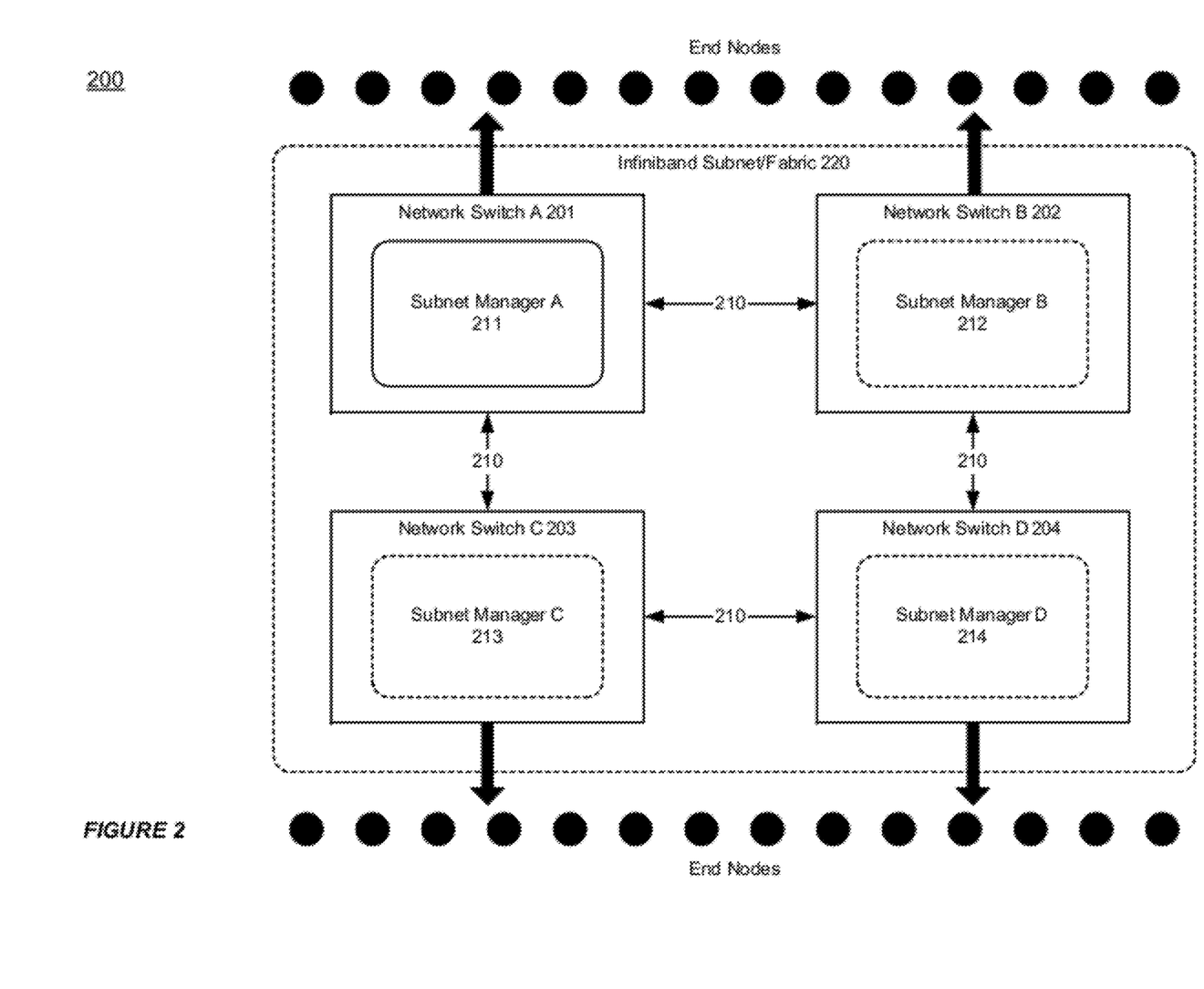
FIG. 2 shows an illustration of a middleware machine environment, in accordance with an embodiment of the invention.

FIG. 2 shows an illustration of a middleware machine environment, in accordance with an embodiment of the invention. As shown in FIG. 2, the middleware machine environment 200 includes an IB subnet or fabric 220 that connects with a plurality of end nodes. The IB subnet includes a plurality of subnet managers 211-214, each of which resides on one of a plurality of network switches 201-204. The subnet managers can communicate with each other using an in-band communication protocol 210, such as the Management Datagram (MAD)/Subnet Management Packet (SMP) based protocols or other protocol such as the Internet Protocol over IB (IPoIB).

In accordance with an embodiment of the invention, a single IP subnet can be constructed on the IB fabric allowing the switches to communicate securely among each other in the same IB fabric (ie. full connectivity among all switches). The fabric based IP subnet can provide connectivity between any pair of switches when at least one route with operational links exists between the two switches. Recovery from link failures can be achieved if an alternative route exists by re-routing.

The management Ethernet interfaces of the switches can be connected to a single network providing IP level connectivity between all the switches. Each switch can be identified by two main IP addresses: one for the external management Ethernet and one for the fabric based IP subnet. Each switch can monitor connectivity to all other switches using both IP addresses, and can use either operational address for communication. Additionally, each switch can have a point-to-point IP link to each directly connected switch on the fabric. Hence, there can be at least one additional IP address.

IP routing setups allow a network switch to route traffic to another switch via an intermediate switch using a combination of the fabric IP subnet, the external management Ethernet network, and one or more fabric level point-to-point IP links between pairs of switches. IP routing allows external management access to a network switch to be routed via an external Ethernet port on the network switch, as well as through a dedicated routing service on the fabric.

The IB fabric includes multiple network switches with managment Ethernet access to a managment network. There is in-band physical connectivity between the switches in the fabric. In one example, there is at least one in-band route of one or more hops between each pair of switches, when the IB fabric is not degraded. Management nodes for the IB fabric include network switches and management hosts that are connected to the IB fabric.

A subnet manager can be accessed via any of its private IP addresses. The subnet manager can also be accessible via a floating IP address that is configured for the master subnet manager when the subnet manager takes on the role as a master subnet manager, and the subnet manager is unconfigured when it is explicitly released from the role. A master IP address can be defined for both the external management network as well as for the fabric based management IP network. No special master IP address needs to be defined for point-to-point IP links.

In accordance with an embodiment of the invention, each physical host can be virtualized using virtual machine based guests. There can be multiple guests existing concurrently per physical host, for example one guest per CPU core. Additionally, each physical host can have at least one dual-ported Host Channel Adapter (HCA), which can be virtualized and shared among guests, so that the fabric view of a virtualized HCA is a single dual-ported HCA just like a non-virtualized/shared HCA.

The IB fabric can be divided into a dynamic set of resource domains implemented by IB partitions. Each physical host and each gateway instance in an IB fabric can be a member of multiple partitions. Also, multiple guests on the same or different physical hosts can be members of the same or different partitions. The number of the IB partitions for an IB fabric may be limited by the P_key table size.

In accordance with an embodiment of the invention, a guest may open a set of virtual network interface cards (vNICs) on two or more gateway instances that are accessed directly from a vNIC driver in the guest. The guest can migrate between physical hosts while either retaining or having updated vNIC associates.

In accordance with an embodiment of the invention, switches can start up in any order and can dynamically select a master subnet manager according to different negotiation protocols, for example an IB specified negotiation protocol. If no partitioning policy is specified, a default partitioning enabled policy can be used. Additionally, the management node partition and the fabric based management IP subnet can be established independently of any additional policy information and independently of whether the complete fabric policy is known by the master subnet manager. In order to allow fabric level configuration policy information to be synchronized using the fabric based IP subnet, the subnet manager can start up initially using the default partition policy. When fabric level synchronization has been achieved, the partition configuration that is current for the fabric can be installed by the master subnet manager.

Supporting Well Defined Subnet Topology

In accordance with an embodiment, a master subnet manager in an IB subnet can support well defined subnet topology for routing packets within the IB subnet.

Figure 3:
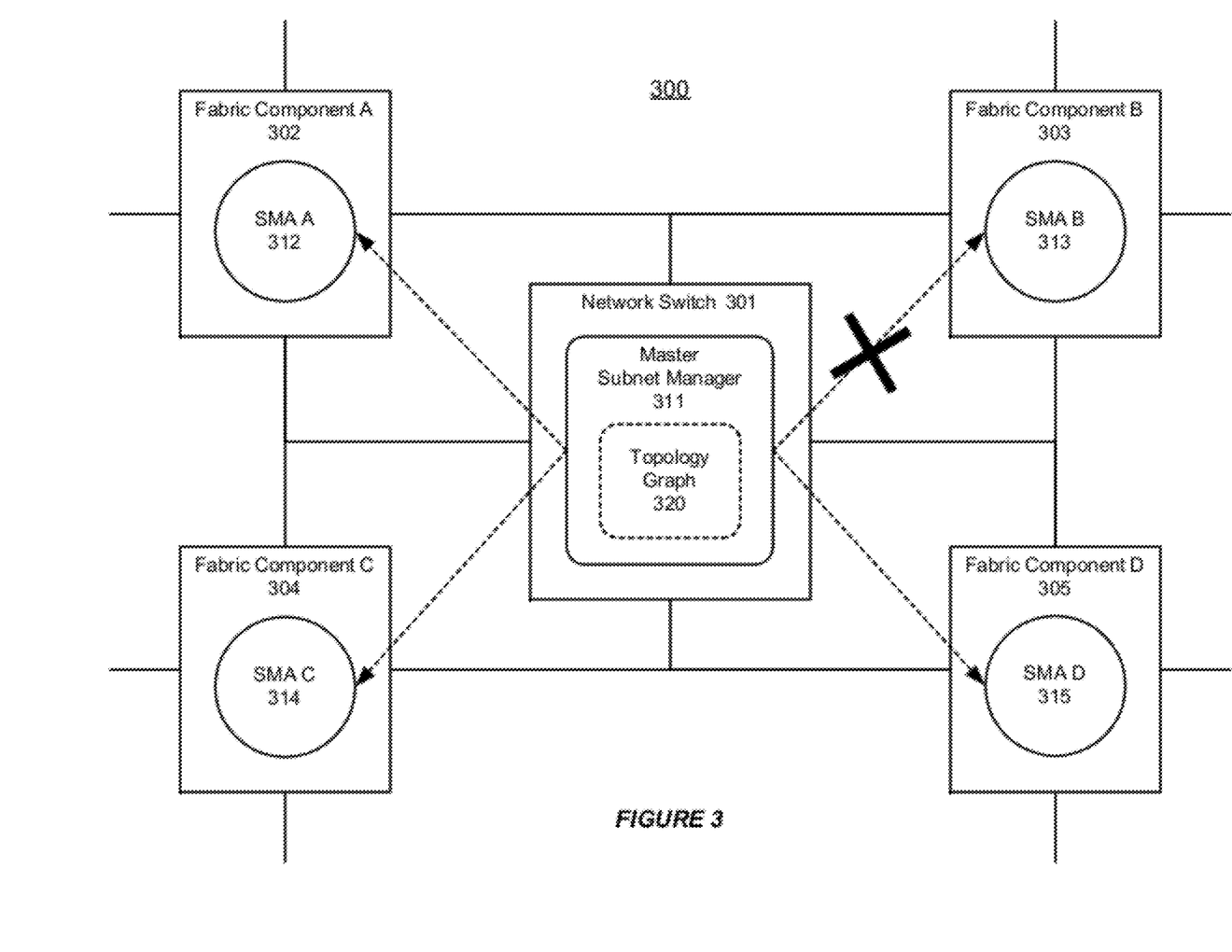
FIG. 3 shows an illustration of a middleware machine environment that supports well defined subnet topology, in accordance with an embodiment of the invention.

FIG. 3 shows an illustration of a middleware machine environment that supports well defined subnet topology, in accordance with an embodiment of the invention. As shown in FIG. 3, an IB fabric 300 in a middleware machine environment includes a subnet manager 311 on a network switch 301 and a plurality of fabric components 302-305. A fabric component in the IB fabric can be either a network switch or a host server.

In accordance with an embodiment of the invention, the subnet manager is a software entity that can discover the topology of the subnet that the subnet manager manages. The subnet manager can assign a common subnet ID and an address to each port in the subnet. The subnet manager can establish the possible paths between all end nodes in the subnet and regularly sweeps the subnet and looks for topology update.

The subnet manager can be a master subnet manager that manages the various fabric components in the IB fabric. The master subnet manager can monitor each fabric component in the IB fabric through a subnet management agent (SMA) 312-315. A SMA on a device can generate and respond to control packets such as SMPs and configure local fabric component for subnet management.

The master subnet manager can send SMP request packets to a subnet management interface (SMI) associated with a fabric component, for example port Qp0 on a target device. When an SMP request packet is received on a device's SMI, the device passes the SMP to the device's SMA for processing of the request. After performing the operations defined in the SMP, the SMA can return an SMP response packet to the SMI, which in turn can transmit the response SMP packet back to the master subnet manager.

The master subnet manager can periodically reevaluate the states associated with the fabric components by carefully determining whether each remote SMA is responding correctly to relevant requests. In the example as shown in FIG. 3, when the master subnet manager determines that a link to a remote SMA 303 is down, the master subnet manager can modify the internal link graph (such as the topology graph 320) and make sure that the topology of the subnet that is used in routing decision is fully operational, in order to avoid inconsistent connectivity states or repeated discovery operations that prevents convergence to a well defined subnet topology.

Further, in the example shown in FIG. 3, the master subnet manager may determine that a physical link to a remote SMA 313 on a remote fabric component B 303 is up, but that the remote SMA 313 is not responding as expected to well defined SMP request packets sent from the subnet manager across said link. In this case, there is an inconsistency between the discovered physical link state and the observed logical state of the remote SMA 313.

There can be different reasons why a SMA is not responding properly. In the above example, fabric component B may suffer a firmware error while the hardware controlled physical link state handling is functioning correctly. Alternatively, the firmware or software that implements all or part of the SMA function for fabric component B may not have started or completed initialization yet, while the hardware (on both sides of the link) has completed the link training sequence and activate the physical link (or brought the physical link state to an up state).

In accordance with an embodiment of the invention, in order to minimize complexity associated with maintaining the complete subnet topology and the associated states, the subnet manager can assume the link to be inactive, or consider the logical state of the link to be equivalent to a case where the physical link state of the link is observed as a down state.

In accordance with an embodiment, the subnet connectivity state can be represented by a topology graph 320 that indicates how ports are connected in a subnet. The topology graph can indicate topology of links (connected port pairs) with no additional state information. This allows different subnet manager operations and algorithms that depend on the connectivity and the state of the subnet to be implemented entirely based on the observed connectivity defined in the topology graph, and can be made independent of any additional state information associated with the related SMA instances. Using this approach, the number of states that different routing algorithms need to take into account can be limited and thereby simplify the verification task. Hence, the ability to verify correctness of these algorithms can be significantly improved.

In accordance with an embodiment, the topology graph can include different links, and each such said link has multiple states depending on the state and responsiveness of the associated SMA instances.

Figure 4:
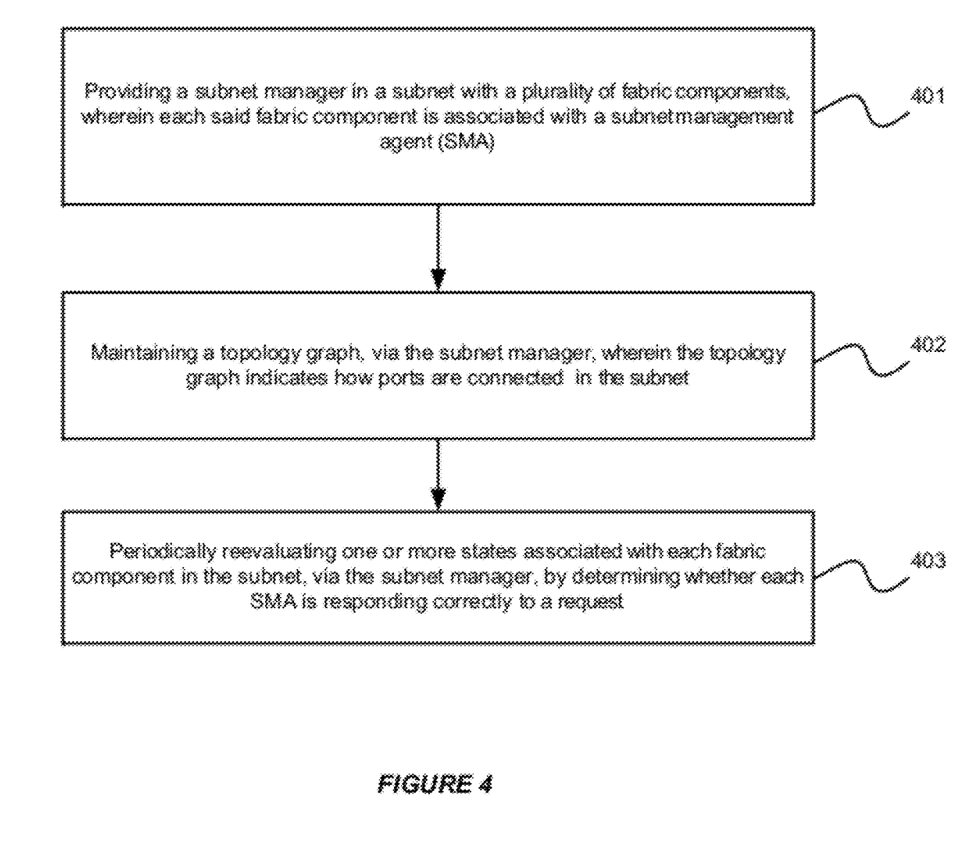
FIG. 4 illustrates an exemplary flow chart for supporting well defined subnet topology in a middleware machine environment, in accordance with an embodiment.

FIG. 4 illustrates an exemplary flow chart for supporting well defined subnet topology in a middleware machine environment, in accordance with an embodiment. As shown in FIG. 4, at step 401, a subnet manager can be provided in a subnet with a plurality of fabric components, and each fabric component is associated with a subnet manager agent (SMA). The subnet manager maintains a topology graph that indicates how ports are connected in the subnet at step 402. Additionally, at step 403, the subnet manager can periodically reevaluate one or more states associated with each fabric component in the subnet by determining whether each SMA is responding correctly to a request.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a middleware machine environment, the middleware machine environment operating, at least partially in a subnet of a network fabric, the subnet including a plurality of fabric components including a plurality of end node servers and plurality of network switches, wherein each fabric component in said plurality of fabric components comprises a subnet management agent (SMA), said method comprising:
  providing a network switch comprising one or more microprocessors;
  providing a subnet manager running on said network switch;
  discovering the topology of the subnet, including a link from a particular fabric component of the plurality of fabric components to the subnet manager;
  maintaining, with said subnet manager, a subnet connectivity state represented by a topology graph of the subnet consisting of a list of links connecting fabric components of said plurality of fabric components included in the subnet, wherein the list of links includes the link from the particular fabric component to the subnet manager, wherein each of said links identifies a pair of ports connecting fabric components of said plurality of fabric components included in the subnet, and wherein said subnet connectivity state is maintained by:
  transmitting a subnet management packet from the subnet manager to the particular fabric component,
  periodically determining whether the link from the particular fabric component of the plurality of fabric components to the subnet manager is up, and
  modifying said topology graph of the subnet to generate a modified topology graph of the subnet by:
    modifying, in said list of links in the topology graph of the subnet, the link from the particular fabric component to the subnet manager to indicate that said link is down when the link from the particular fabric component to the subnet manager has an observed physical state of down, and
    modifying, in said list of links in the topology graph of the subnet, the link from the particular fabric component to the subnet manager to indicate that said link is down when the link from the particular fabric component to the subnet manager has an observed physical state of up but the particular fabric component has an SMA which does not respond correctly to said subnet management packet; and
  establishing, with said subnet manager, routes and at least one alternative route for routing packets between all of said plurality of end node servers within said subnet and for the particular fabric component using a routing algorithm, wherein said routing algorithm is implemented using the subnet connectivity state defined in said modified topology graph of the subnet.

2. The method of claim 1, further comprising:
  assigning, by the subnet manager, a common subnet ID and address to each port in the subnet.

3. The method of claim 1, further comprising:
  sweeping, by the subnet manager, the subnet and looking for topology updates in the subnet.

4. The method of claim 1, further comprising:
  using a routing algorithm that does not take into account the various states associated with said SMAs.

5. The method of claim 1, wherein:
  the subnet manager is a master subnet manager that manages said plurality of fabric components included in the subnet.

6. The method of claim 1, further comprising:
  implementing said routing algorithm independently of the logical state of the subnet management agents associated with each of the plurality of fabric components included in the subnet.

7. The method of claim 1, further comprising:
  providing the subnet with a separate storage system.

8. A system for supporting a middleware machine environment, the middleware machine environment operating, at least partially in a subnet of a network fabric, the subnet including a plurality of fabric components including a plurality of end node servers and a plurality of network switches, wherein each fabric component in said plurality of fabric components comprises a subnet management agent (SMA), said system comprising:
  a network switch comprising one or more microprocessors;
  a subnet manager running on the one or more microprocessors of said network switch;
  wherein the subnet manager is configured to:
  discover the topology of the subnet, including a link from a particular fabric component of the plurality of fabric components to the subnet manager;
  maintain a subnet connectivity state represented by a topology graph of the subnet consisting of a list of links connecting fabric components of said plurality of fabric components included in the subnet, wherein the list of links includes the link from the particular fabric component to the subnet manager, wherein each of said links identifies a pair of ports connecting fabric components of said plurality of fabric components included in the subnet, and wherein said subnet connectivity state is maintained by:
  transmitting a subnet management packet from the subnet manager to the particular fabric component,
    periodically determining whether the link from the particular fabric component of the plurality of fabric components to the subnet manager is up, and
    modifying said topology graph of the subnet to generate a modified topology graph of the subnet by:
      modifying, in said list of links in the topology graph of the subnet, the link from the particular fabric component to the subnet manager to indicate that said link is down when the link from the particular fabric component to the subnet manager has an observed physical state of down, and
      modifying, in said list of links in the topology graph of the subnet, the link from the particular fabric component to the subnet manager to indicate that said link is down when the link from the particular fabric component to the subnet manager has an observed physical state of up but the particular fabric component has an SMA which does not respond correctly to said subnet management packet; and
  wherein the subnet manager is further configured to establish routes and at least one alternative route for routing packets between all of said plurality of end node servers within said subnet and for the particular fabric component using a routing algorithm, wherein said routing algorithm is implemented using the subnet connectivity state defined in said modified topology graph of the subnet.

9. The system according to claim 8, wherein:
  the subnet is in a fat-tree topology.

10. The system according to claim 8, wherein:
  the subnet manager assigns a common subnet ID and address to each port in the subnet.

11. The system according to claim 8, wherein:
the subnet manager sweeps the subnet and looks for topology update in the subnet.

12. The system according to claim 8, wherein:
the subnet manager sends subnet management request packets (SMPs) to a SMA on the particular fabric component in the subnet via a subnet management interface (SMI) on the particular fabric component.

13. The system according to claim 12, wherein:
the SMA operates to return a response SMP to the SMI, which in turn transmits the response SMP packet back to the subnet manager.

14. The system according to claim 8, wherein:
the topology graph of the subnet allows the subnet to use a routing algorithm that does not take into account the various states associated with said SMAs.

15. The system according to claim 8, further comprising:
the subnet manager is a master subnet manager that manages said plurality of fabric components included in the subnet.

16. The system according to claim 8, wherein:
the subnet includes a separate storage system.

17. The system according to claim 8, wherein:
the subnet manager operates to implement said routing algorithm independently of the logical state of the subnet management agents associated with each of the plurality of fabric components included in the subnet.

18. A non-transitory machine readable medium having instructions stored thereon for supporting a middleware machine environment having a network switch and operating, at least partially in a subnet of a network fabric, the subnet including a plurality of fabric components including a plurality of end node servers and a plurality of network switches, wherein each fabric component in said plurality of fabric components is associated with a subnet management agent (SMA), which instructions when executed cause a system to perform steps comprising:
providing a network switch comprising one or more microprocessors;
providing a subnet manager running on said network switch;
discovering the topology of the subnet, including a link from a particular fabric component of the plurality of fabric components to the subnet manager;
maintaining, with said subnet manager, a subnet connectivity state represented by a topology graph of the subnet consisting of a list of links connecting fabric components of said plurality of fabric components included in the subnet, wherein the list of links includes the link from the particular fabric component to the subnet manager, wherein each of said links identifies a pair of ports connecting fabric components of said plurality of fabric components included in the subnet, and wherein said subnet connectivity state is maintained by:
transmitting a subnet management packet from the subnet manager to the particular fabric component,
periodically determining whether the link from the particular fabric component of the plurality of fabric components to the subnet manager is up, and
modifying said topology graph of the subnet to generate a modified topology graph of the subnet by:
modifying, in said list of links in the topology graph of the subnet, the link from the particular fabric component to the subnet manager to indicate that said link is down when the link from the particular fabric component to the subnet manager has an observed physical state of down, and
modifying, in said list of links in the topology graph of the subnet, the link from the particular fabric component to the subnet manager to indicate that said link is down when the link from the particular fabric component to the subnet manager has an observed physical state of up but the particular fabric component has an SMA which does not respond correctly to said subnet management packet; and
establishing, with said InfiniBand subnet manager, paths routes and at least one alternative route for routing packets between all of said plurality of end node servers within said subnet and for the particular fabric component using a routing algorithm, wherein said routing algorithm is implemented using the subnet connectivity state defined in said modified topology graph of the subnet.

* * * * *

UNITED STATES PATENT AND TRADEMARK OFFICE
CERTIFICATE OF CORRECTION

| | | |
|---|---|---|
| PATENT NO. | : 10,630,570 B2 | Page 1 of 1 |
| APPLICATION NO. | : 13/235161 | |
| DATED | : April 21, 2020 | |
| INVENTOR(S) | : Johnsen et al. | |

It is certified that error appears in the above-identified patent and that said Letters Patent is hereby corrected as shown below:

In the Specification

In Column 1, Line 4, below "MIDDLEWARE MACHINE ENVIRONMENT" insert
-- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In Column 3, Line 42, delete "(IPolB)." and insert -- (IPoIB). --, therefor.

In Column 4, Line 5, delete "managment Ethernet" and insert -- management Ethernet --, therefor.

In Column 4, Line 5, delete "managment network." and insert -- management network. --, therefor.

In the Claims

In Column 10, Line 35, in Claim 18, after "said" delete "InfiniBand".

Signed and Sealed this
Fourth Day of May, 2021

Drew Hirshfeld
*Performing the Functions and Duties of the
Under Secretary of Commerce for Intellectual Property and
Director of the United States Patent and Trademark Office*